United States Patent
Yang et al.

(10) Patent No.: US 12,384,904 B2
(45) Date of Patent: Aug. 12, 2025

(54) POLYOLEFIN COMPOSITIONS HAVING IMPROVED ELECTRICAL PROPERTIES

(71) Applicant: Dow Global Technologies LLC, Midland, MI (US)

(72) Inventors: Yunfeng Yang, Shanghai (CN); Xiaosong Wu, Sugar Land, TX (US); Juan C. Tuberquia, Manvel, TX (US); Yong Chen, Shanghai (CN); Xianmin Xu, Shanghai (CN); Tao Han, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/638,510

(22) PCT Filed: Aug. 26, 2020

(86) PCT No.: PCT/US2020/048025
§ 371 (c)(1),
(2) Date: Feb. 25, 2022

(87) PCT Pub. No.: WO2021/041562
PCT Pub. Date: Mar. 4, 2021

(65) Prior Publication Data
US 2022/0411611 A1 Dec. 29, 2022

(30) Foreign Application Priority Data
Aug. 30, 2019 (WO) ............... PCT/CN2019/103783

(51) Int. Cl.
| | |
|---|---|
| *C08K 13/04* | (2006.01) |
| *C08J 3/24* | (2006.01) |
| *C08K 3/22* | (2006.01) |
| *C08K 5/3435* | (2006.01) |
| *C08K 5/00* | (2006.01) |
| *C08K 5/5425* | (2006.01) |
| *C08K 7/24* | (2006.01) |

(52) U.S. Cl.
CPC ............... *C08K 13/04* (2013.01); *C08J 3/24* (2013.01); *C08K 3/22* (2013.01); *C08K 5/3435* (2013.01); *C08J 2323/08* (2013.01); *C08J 2323/14* (2013.01); *C08J 2323/16* (2013.01); *C08J 2353/00* (2013.01); *C08K 2003/2227* (2013.01); *C08K 5/005* (2013.01); *C08K 5/5425* (2013.01); *C08K 7/24* (2013.01)

(58) Field of Classification Search
CPC ......... C08L 23/00; H01B 3/00; C08F 210/18; C08K 2003/2227
See application file for complete search history.

(56) References Cited

U.S. PATENT DOCUMENTS

| | | | |
|---|---|---|---|
| 4,623,755 A | 11/1986 | Henkel et al. | |
| 5,851,968 A | 12/1998 | Schnur | |
| 2009/0068441 A1* | 3/2009 | Swaroop | C08K 3/01 |
| | | | 252/75 |
| 2009/0226711 A1 | 9/2009 | Silvi et al. | |
| 2010/0314026 A1* | 12/2010 | Donovan | B32B 5/022 |
| | | | 442/37 |
| 2012/0293909 A1 | 11/2012 | Tatemichi et al. | |
| 2014/0232962 A1 | 8/2014 | Ishida et al. | |
| 2015/0291823 A1* | 10/2015 | Fu | H01B 3/28 |
| | | | 428/375 |
| 2020/0255632 A1* | 8/2020 | Lee | B60C 1/0025 |

FOREIGN PATENT DOCUMENTS

| | | | | |
|---|---|---|---|---|
| CA | 3057934 A1 | * | 4/2021 | |
| CN | 103289214 A | * | 9/2013 | |
| CN | 104327456 A | | 2/2015 | |
| CN | 104610634 A | | 5/2015 | |
| CN | 106009190 A | | 10/2016 | |
| CN | 106206790 | | 12/2016 | |
| CN | 106206790 A | | 12/2016 | |
| CN | 106750853 A | | 5/2017 | |
| CN | 107141624 | | 9/2017 | |
| CN | 107141624 A | * | 9/2017 | |
| CN | 107383538 A | | 11/2017 | |
| JP | 2006176717 A | * | 7/2006 | |
| WO | WO-0232983 A1 | * | 4/2002 | C08K 5/005 |
| WO | 2011057927 | | 5/2011 | |
| WO | WO-2011057927 A1 | * | 5/2011 | C08F 10/02 |
| WO | 2016101988 | | 6/2016 | |
| WO | WO-2016101988 A1 | * | 6/2016 | |
| WO | 2019084772 A1 | | 5/2019 | |
| WO | 2019084773 A1 | | 5/2019 | |

(Continued)

OTHER PUBLICATIONS

Stevens (Constrained Geometry and Other Single Site Metallocene Polyolefin Catalysts: A Revolution In Olefin Polymerization, Studies in Surface Science and Catalysis, 101, 1996, pp. 11-20).*

(Continued)

*Primary Examiner* — Brieann R Johnston
(74) *Attorney, Agent, or Firm* — Karen L. Beckman

(57) ABSTRACT

The present disclosure relates to a curable composition comprising: (A) a polyolefin; (B) a fumed alumina; (C) a silane compound; (D) a UV stabilizer; and, optionally, (E) a crosslinking agent, where the curable composition demonstrates improved electrical properties. The present disclosure further relates to a crosslinked polymer composition that is the reaction product of the curable composition, where improved electrical properties are demonstrated as well.

9 Claims, No Drawings

(56) References Cited

FOREIGN PATENT DOCUMENTS

WO      2020115522 A1    6/2020
WO      2021/035713 A    3/2021

OTHER PUBLICATIONS

Machine translation of JP 2006176717 (2006, 23 pages).*
Machine translation of CN 107141624 (2017, 7 pages).*
Machine translation of CN 103289214 (2013, 3 pages).*
Patel, "Volume Resistivity of Epoxy containing Nano-sized Al2O3 fillers", 2008, p. 361-365.
PCT/CN2019/103783, Search Report and Written Opinion with a mailing date of Jun. 3, 2020.
PCT/US2020/048025, Search Report and Written Opinion with a mailing date of Nov. 5, 2020.
PCT/US2020/048025, International Preliminary Report on Palatability with a mailing date of Mar. 10, 2022.
Office Action from corresponding Chinese application: 2020800650145 dated Mar. 23, 2024.
Stevens, "Constrained geometry and other single site metallocene polyolefin catalysts: A revolution in olefin polymerization", Elsevier: Studies in Surface Science and Catalysis, 1996, vol. 101, pp. 11-20.

* cited by examiner

POLYOLEFIN COMPOSITIONS HAVING IMPROVED ELECTRICAL PROPERTIES

CROSS-REFERENCE TO RELATED APPLICATIONS

This application claims the benefit of international application no. PCT/CN2019/103783, filed Aug. 30, 2019, which is incorporated by reference herein in its entirety.

BACKGROUND

Good electrical properties are required for polyolefins in a variety of applications, such as wire & cable, electrical accessories, hose, automotive weatherstrip applications. These applications require polyolefins with high volume resistivity (VR) and low dissipation factor (DF) since these properties are generally understood to help improve electrochemical degradation (ECD) resistance and reduce electrical loss.

Polyolefins can be produced via different catalyst systems, such as a Ziegler-Natta (Z-N) catalyst system or a non-Ziegler-Natta (non-Z-N) catalyst system. The Z-N catalyst system is traditional technology and has low catalyst efficiency, thus requiring high loading of catalyst and a de-ashing step for purification. Non-Z-N catalyst systems have tremendously higher efficiency and does not require de-ashing, thereby significantly increasing productivity and largely reducing production costs. Beyond this, polyolefins produced via non-Z-N catalysts have a more homogenous composition and improved properties.

However, regarding electrical properties, Z-N catalyzed polyolefins may outperform non-Z-N catalyzed polyolefins. For example, regarding VR and DF (electrical loss), Z-N catalyzed EPDM far outperforms EPDM produced via non-Z-N catalysts. Accordingly, there is a need for improving the VR and DF properties of non-Z-N catalyzed polyolefin compositions for electrical applications so that the advantages of the non-Z-N catalyst system can be brought to such applications.

SUMMARY

In certain embodiments, the present disclosure relates to a curable composition comprising: (A) a polyolefin, (B) a fumed alumina, (C) a silane compound, and (D) a UV stabilizer. Optionally, the curable composition may further comprise other components, such as (E) a crosslinking agent, (F) a crosslinking co-agent, and/or (G) an additive component.

In further embodiments, the present disclosure relates to a crosslinked polymer composition that is the reaction product of a curable composition comprising: (A) a polyolefin, (B) a fumed alumina, (C) a silane compound, and (D) a UV stabilizer. Optionally, the curable composition may further comprise other components, such as (E) a crosslinking agent, (F) a crosslinking co-agent, and/or (G) an additive component.

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, (whether polymerized or otherwise), unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "polymer" refers to a material prepared by reacting (i.e., polymerizing) a set of monomers, wherein the set is a homogenous (i.e., only one type) set of monomers or a heterogeneous (i.e., more than one type) set of monomers. The term polymer as used herein includes the term "homopolymer," which refers to polymers prepared from a homogenous set of monomers, and the term "interpolymer" as defined below.

The term "interpolymer" refers to a polymer prepared by the polymerization of at least two different types of monomers. This term include both "copolymers," i.e., polymers prepared from two different types of monomers, and polymers prepared from more than two different types of monomers, e.g., terpolymers, tetrapolymers, etc. This term also embraces all forms of interpolymers, such as random, block, homogeneous, heterogeneous, etc.

The term "ethylene/alpha-olefin interpolymer," as used herein, refers to a polymer that comprises, in polymerized form, a majority weight percent of ethylene (based on the weight of the interpolymer), and at least one comonomer that is an alpha-olefin. The ethylene/alpha-olefin interpolymer may be a random or block interpolymer. The terms "ethylene/alpha-olefin copolymer" and "ethylene/alpha-olefin multi-block interpolymer" are covered by the term "ethylene/alpha-olefin interpolymer."

The term "ethylene/alpha-olefin copolymer," as used herein, refers to a copolymer that comprises, in polymerized form, a majority weight percent of ethylene (based on the weight of the copolymer), and a comonomer that is an alpha-olefin, where ethylene and the alpha-olefin are the only two monomer types. The ethylene/alpha-olefin copolymer may be a random or block copolymer.

The term "ethylene/alpha-olefin multi-block interpolymer" or "olefin block copolymer," as used herein, refers to an interpolymer that includes ethylene and one or more copolymerizable alpha-olefin comonomers in polymerized form, characterized by multiple blocks or segments of two or more (preferably three or more) polymerized monomer units, the blocks or segments differing in chemical or physical properties. Specifically, this term refers to a polymer comprising two or more (preferably three or more) chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), region-regularity or region-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalyst systems. Non-limiting examples of the olefin block copolymers of the present disclosure, as well as the processes for preparing the same, are disclosed in U.S. Pat. Nos. 7,858,706 B2, 8,198,374 B2, 8,318,864 B2, 8,609,779 B2, 8,710,143 B2, 8,785,551 B2, and 9,243,090 B2, which are all incorporated herein by reference in their entirety.

The term "ethylene/alpha-olefin/diene interpolymer," as used herein, refers to a polymer that comprises, in polymerized form, ethylene, an alpha-olefin, and a diene. In one embodiment, the "ethylene/alpha olefin/diene interpolymer" comprises a majority weight percent of ethylene (based on the weight of the interpolymer).

The term "propylene/alpha-olefin interpolymer," as used herein, refers to a polymer that comprises, in polymerized form, a majority weight percent of propylene (based on the weight of the interpolymer), and at least one comonomer that is an alpha-olefin (where ethylene is considered an alpha-olefin). The propylene/alpha-olefin interpolymer may be a random or block interpolymer. The term "propylene/alpha-olefin interpolymer" includes the term "propylene/alpha-olefin copolymer."

The term "propylene/alpha-olefin copolymer," as used herein, refers to a copolymer that comprises, in polymerized form, a majority weight percent of propylene (based on the weight of the copolymer), and a comonomer that is an alpha-olefin, wherein propylene and the alpha-olefin are the only two monomer types. The propylene/alpha-olefin copolymer may be a random or block copolymer.

A "polyolefin" is a polymer produced from the polymerization of an olefin as a monomer, where an olefin monomer is a linear, branched, or cyclic compound of carbon and hydrogen having at least one double bond. Accordingly, the term "polyolefin," as used herein, includes and covers the terms "ethylene/alpha-olefin interpolymer," "ethylene/alpha-olefin copolymer," "ethylene/alpha-olefin multiblock interpolymer," "ethylene/alpha-olefin/diene interpolymer," "propylene/alpha-olefin interpolymer," and "propylene/alpha-olefin copolymer."

The term "Ziegler Natta catalyst," as used herein, refers to a vanadium-based catalyst. "Ziegler Natta catalyzed polymers" or like terms, as used herein, refer to polymers having a vanadium content that is greater than 0.4 ppm according to the methods disclosed herein or similar methods.

The term "non-Ziegler Natta catalyst," as used herein, refers to catalysts based on Group 4 metals, including those known in the art as metallocene catalysts, constrained geometry complex (CGC) catalysts, post-metallocene catalysts, molecular catalysts, and advanced molecular catalysts. "Non-Ziegler Natta catalyzed polymers" and like terms, as used herein, refer to polymers having a Group 4 metal content of 0.3 ppm or higher, according to the methods disclosed herein or similar methods. "Non-Ziegler Natta catalyzed polymers" may also have a vanadium content of less than or equal to 0.4 ppm, according to the methods disclosed herein or similar methods.

Test Methods

Each property described in the present disclosure is in accordance with the following methods.

Mooney viscosity: Mooney Viscosity is measured in a Mooney shearing disk viscometer in accordance with ASTM 1646. The instrument is an Alpha Technologies Mooney Viscometer 2000. The torque to turn the rotor at 2 rpm is measured by a torque transducer. The sample is preheated for 1 minute (min) after the platens is closed. The motor is then started and the torque is recorded for a period of 4 min. Results are reported as "ML (1+4) at 125° C." in Mooney Units (MU). The term "ML" indicates that a large rotor, "Mooney Large," is used in the viscosity test, where the large rotor is the standard size rotor. Mooney viscosity (MV) measures the resistance of polymer to flow at a relatively low shear rate and indicates the flowability of the polymer.

Density: Density is measured in accordance with ASTM D792, Method B. The result is recorded in grams per cubic centimeter (g/cc or g/cm$^3$).

Monomer content: Ethylene content and propylene content of the interpolymers, as weight percentage, is determined by Fourier Transform Infrared (FTIR) analysis in accordance with ASTM D3900. Diene (ENB) content of the interpolymers as a weight percentage is determined by Fourier Transform Infrared (FTIR) analysis in accordance with ASTM D6047.

Residual elemental analysis: Residual elemental analysis to determine metal content of the interpolymer (e.g., vanadium content, Group 4 metal content, titanium content, hafnium content, and/or zirconium content) is performed using Inductively Coupled Plasma-Atomic Emission Spectroscopy (ICP-AES) techniques. For ICP-AES analysis, the samples are weighed into quartz tubes and 1 mL water and 3 mL nitric acid are added to the samples. The samples are placed in a hot block at 115° C. for 30 minutes. The samples are then placed in an UltraWave Microwave oven where they are digested at 250° C. After digestion in the microwave, the samples are diluted and analyzed by a Perkin Elmer ICP for aluminum, calcium, chromium titanium and vanadium. Results are reported in parts per million (ppm).

Gel Permeation Chromatography ("GPC"): The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } Rv_{one\,tenth\,height})} \quad (EQ\ 3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

$$Mz_{(GPC)} = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−1% of the nominal flowrate.

$$\text{Flowrate(effective)} = \text{Flowrate(nominal)} * (RV(FM\ Calibrated)/RV(FM\ Sample)) \quad (EQ7)$$

Volume Resistivity: The volume resistivity is determined by the following method which is based on ASTM D257. The volume resistivity is determined using a Keithley 6517 B electrometer, combined with the Keithley 8009 test fixture. The Keithley model 8009 test chamber is located inside the forced air oven which is capable of operating at elevated temperatures (maximum temperature 80° C.). The leakage current is recorded from the instrument via software and the following equation is used to calculate the volume resistivity (VR):

$$\rho = \frac{V \times A}{I \times t}$$

wherein $\rho$ is the volume resistivity in ohm.cm, V is the applied voltage in volts, A is the electrode contact area in cm², I is the leakage current in amps recorded after 10 minutes of applied voltage, and t is the thickness of the sample. The thickness of the compression molded film is measured before the test. Five points of the film are measured to get the average thickness, which is used in the calculation. The test is conducted at 500 volts at room temperature. Two compression molded films are tested and the recorded VR is the average of the two tests. Results are reported in ohm-centimeters (ohm.cm).

Dissipation factor (DF): Dissipation factor was measured using cured films. The film thickness was about 0.8 mm. The cured film samples were degassed at 70° C. for 24 hours before the measurement. The measurement was carried out at 90° C. under 2 kV/mm stress level and 50 Hz. YG9187 high precision high voltage capacitance bridge from Shanghai Young Electrical Co., Ltd was used for the measurement. The measurement conformed to GB/T 1409-2006.

DETAILED DESCRIPTION

Polyolefin

The (A) polyolefin of the present disclosure may be any interpolymer in which an olefin is the primary monomer. That is, the polyolefin may be an interpolymer comprising a majority amount of polymerized units derived from an olefin monomer, wherein the interpolymer further comprises units derived from a comonomer that is a different from the olefin monomer and is a C2-C30 linear, branched or cyclic alpha-olefin. For purposes of this disclosure, ethylene is an alpha-olefin. Non-limiting examples of C2-C30 alpha-olefins for use as comonomers include ethylene, propylene, 1-butene, 4-methyl-1-pentene, 1-hexene, 1-octene, 1-decene, 1-dodecene, 1-tetradecene, 1-hexadecene, and 1-octadecene.

In certain embodiments, the polyolefin is an ethylene/alpha-olefin interpolymer. Non-limiting examples of ethylene/alpha-olefin interpolymers include interpolymers of ethylene and C3-C8 alpha-olefins, or C4-C8 alpha-olefins, such as ethylene/propylene interpolymers, ethylene/1-butene interpolymers, ethylene/1-hexene interpolymers, ethylene/1-octene interpolymers, and combinations thereof.

In certain embodiments, the polyolefin is an ethylene/alpha-olefin copolymer. Non-limiting examples of ethylene/alpha-olefin copolymers include copolymers of ethylene and C3-C8 alpha-olefins, or C4-C8 alpha-olefins, such as ethylene/propylene copolymers, ethylene/1-butene copolymers, ethylene/1-hexene copolymers, ethylene/1-octene copolymers, and combinations thereof.

In certain embodiments, the polyolefin is an ethylene/alpha-olefin/diene interpolymer, as further discussed below.

In further embodiments, the polyolefin is an ethylene/alpha-olefin multi-block interpolymer or olefin block copolymer as defined herein.

In certain embodiments, the polyolefin is a propylene/alpha-olefin interpolymer. Non-limiting examples of propylene/alpha-olefin interpolymers include propylene/ethylene interpolymers, propylene/1-butene interpolymers, propylene/1-hexene interpolymers, propylene/1-octene interpolymers, and combinations thereof. In further embodiments, the polyolefin is a propylene/alpha-olefin copolymer. Non-limiting examples of propylene/alpha-olefin copolymers include propylene/ethylene copolymers, propylene/1-butene copolymers, propylene/1-hexene copolymers, propylene/1-octene copolymers, and combinations thereof.

In certain embodiments, the polyolefin is absent a heteroatom. The term "heteroatom," as used herein, is an atom other than carbon or hydrogen. The heteroatom can be a non-carbon atom from Groups IV, V, VI and VII of the Periodic Table. Non-limiting examples of heteroatoms include: F, N, O, P, B, S, and Si.

In certain embodiments, the polyolefin has a vanadium content of (or comprises vanadium in an amount of) less than or equal to 0.4 ppm or less than or equal to 0.3 ppm, in accordance with the methods disclosed herein or similar methods. In further embodiments, the polyolefin has a Group 4 metal content (or comprises a Group 4 metal in an amount of) greater than or equal to 0.3 ppm, or greater than or equal to 0.4 ppm, or greater than or equal to 0.5 ppm, or greater than or equal to 0.6 ppm, in accordance with the methods disclosed herein or similar methods. In further embodiments, the polyolefin has a vanadium content of (or comprises vanadium in an amount of) less than or equal to 0.4 ppm or less than or equal to 0.3 ppm and/or a Group 4 metal content (or comprises a Group 4 metal in an amount of) greater than or equal to 0.3 ppm, or greater than or equal to 0.4 ppm, or greater than or equal to 0.5 ppm, or greater than or equal to 0.6 ppm.

In further embodiments, the polyolefin has one, some, or all of the following: a Mooney viscosity (ML 1+4 at 125° C.) from greater than zero to 100 MU, or from 5 to 100 MU, in accordance with ASTM D1646; a density from 0.850 g/cc to 0.920 g/cc, in accordance with ASTM D792, Method B; from 40 wt % to 80 wt %, or from 50 wt % to 80 wt %, of polymerized ethylene; from zero to 10 wt % of polymerized diene; and a molecular weight distribution (MWD or Mw/Mn) from 1 to 7, or from 1 to 5, or from 2 to 4.

In certain embodiments, the polyolefin has, in accordance with ASTM D792, Method B, a density from 0.850 g/cc to 0.920 g/cc, or from 0.860 g/cc to 0.910 g/cc, or from 0.860 g/cc to 0.900 g/cc, or from 0.860 g/cc to 0.890 g/cc.

In some embodiments, the polyolefin has, in accordance with ASTM D1238, a melt index, at 190° C./2.16 kg, from 0.1 to 1,000 dg/min, or from 0.1 to 500 dg/min, or from 0.1 to 100 dg/min, or from 0.1 to 75 dg/min, or from 0.1 to 50 dg/min, or from 0.1 to 25 dg/min, or from 0.5 to 15 dg/min, or from 1 to 10 dg/min.

In some embodiments, the polyolefin has, in accordance with ASTM D1238, a melt flow rate, at 230° C./2.16 kg, from 0.1 to 1,000 dg/min, or from 0.1 to 500 dg/min, or from 0.1 to 100 dg/min, or from 0.1 to 75 dg/min, or from 0.1 to 50 dg/min, or from 0.1 to 25 dg/min, or from 0.5 to 15 dg/min, or from 1 to 10 dg/min. Suitable polyolefins include but are not limited to those available under the tradenames NORDEL™, ENGAGE™, INFUSE™, and VERSIFY™ from The Dow Chemical Company, Exact™ and Vistamaxx™ from ExxonMobil Chemical Company, and LUCENE™ from LG Chemical.

The polyolefin may have any combination of embodiments described herein.

Ethylene/Alpha-Olefin/Diene Interpolymer

In embodiments where the (A) polyolefin of the present disclosure is an ethylene/alpha-olefin/diene interpolymer, the ethylene/alpha-olefin/diene interpolymer comprises, in polymerized form, ethylene, an alpha-olefin, and a diene. The diene may be conjugated or non-conjugated. Suitable examples of alpha-olefins include C3-C20 alpha-olefins or C3-C10 alpha-olefins. Suitable examples of dienes include C4-C40 non-conjugated dienes.

The alpha-olefin may be either an aliphatic or aromatic compound. In some embodiments, the alpha-olefin is a C3-C10 aliphatic alpha-olefin. In some embodiments, the alpha-olefin is selected from the group consisting of propylene, 1-butene, 1-hexene and 1-octene. In certain embodiments, the alpha-olefin is propylene.

In certain embodiments, the diene is a non-conjugated diene that is acyclic or cyclic. Non-limiting examples of non-conjugated dienes include straight chain acyclic dienes, such as 1,4-hexadiene, 1,5-heptadiene, and 1,9-decadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene and methyl tetrahydroindene; alkenyl, alkylidene, cycloalkenyl and cycloalkylidene norbornenes, such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In further embodiments, the diene is a non-conjugated diene selected from the group consisting of ENB, dicyclopentadiene, 1,4-hexadiene, and 7-methyl-1,6-octadiene. In further embodiments, the diene is ENB.

In some embodiments, the ethylene/alpha-olefin/diene interpolymer is an ethylene/propylene/diene (EPDM) interpolymer. In further embodiments, the ethylene/alpha-olefin/diene interpolymer is an ethylene/propylene/diene (EPDM) interpolymer, wherein the diene is ENB.

In some embodiments, the ethylene/alpha-olefin/diene interpolymer is prepared with a non-Ziegler Natta catalyst, such as a CGC catalyst, an advanced molecular catalyst, or a post-metallocene catalyst. Examples of such catalysts include but are not limited to those disclosed in U.S. Pat. Nos. 5,272,236; 5,278,272; and 8,101,696, and the publications US 2005/0164872 and WO 2007/136494, each fully incorporated herein by reference.

In some embodiments, the ethylene/alpha-olefin/diene interpolymer has a Mooney viscosity (ML 1+4 at 125° C.) from greater than 0 to 100 MU, or from 5 to 100 MU, in accordance with ASTM D1646. In certain embodiments, the ethylene/alpha-olefin/diene interpolymer has a Mooney viscosity (ML 1+4 at 125° C.) from 5 MU, or 10 MU, 15 MU, or 18 MU, or 20 MU, or 25 MU, or 30 MU, or 35 MU to 40 MU, or 45 MU, or 50 MU, or 55 MU, or 60 MU, or 65 MU, or 70 MU, or 75 MU, or 80 MU, or 85 MU, or 90 MU, or 99 MU, or 100 MU, in accordance with ASTM D1646.

In further embodiments, the ethylene/alpha-olefin/diene interpolymer has, in accordance with ASTM D1646, a Mooney viscosity (ML 1+4 at 125° C.) from greater than 0 to 100 MU, or from 5 MU to 100 MU, or from 15 MU to 100 MU, or from 15 MU to 99 MU, or from 15 MU to 90 MU, or from 15 MU to 80 MU, or from 15 MU to 70 MU, or from 15 MU to 60 MU, or from 15 MU to 50 MU, or from 18 MU to 45 MU, or from 18 MU to 40 MU.

In certain embodiments, the ethylene/alpha-olefin/diene interpolymer has, in accordance with ASTM D792, Method B, a density from 0.850 g/cc, or 0.860 g/cc, or 0.870 g/cc to 0.880 g/cc, or 0.890 g/cc, or 0.900 g/cc, or 0.910 g/cc, or 0.920 g/cc. In further embodiments, the ethylene/alpha-olefin/diene interpolymer has, in accordance with ASTM D792, Method B, a density from 0.850 g/cc to 0.920 g/cc, or from 0.860 g/cc to 0.910 g/cc, or from 0.860 g/cc to 0.900 g/cc, or from 0.860 g/cc to 0.890 g/cc, or from 0.860 g/cc to 0.880 g/cc.

In some embodiments, the ethylene/alpha-olefin/diene interpolymer comprises a majority amount of polymerized ethylene, based on the weight of the interpolymer. In certain embodiments, the ethylene/alpha-olefin/diene interpolymer comprises from 40 wt %, or 45 wt %, or 50 wt %, or 55 wt %, or 60 wt %, or 68 wt % to 70 wt %, or 71 wt %, or 75 wt %, or 80 wt %, or 85 wt % of polymerized ethylene. In further embodiments, the ethylene/alpha-olefin/diene interpolymer comprises from 40 to 80 wt %, or from 50 to 80 wt % or from 55 to 70 wt % of polymerized ethylene.

In certain embodiments, the ethylene/alpha-olefin/diene interpolymer comprises from greater than 0 wt %, or 0.5 wt %, or 1 wt %, or 2 wt %, or 3 wt %, or 3.5 wt %, or 4 wt %, or 4.5 wt %, or 4.7 wt % to 4.9 wt %, or 5 wt %, or 6 wt %, or 7 wt %, or 7.5 wt %, or 8 wt %, or 8.5 wt %, or 9 wt %, or 10 wt % of polymerized diene, based on the weight of the interpolymer. In further embodiments, the ethylene/alpha-olefin/diene interpolymer comprises from greater than zero to 10 wt %, or from 0.5 wt % to 9 wt %, or from 0.5 wt % to 8.5 wt % of polymerized diene, such as polymerized ENB.

In some embodiments, the ethylene/alpha-olefin/diene interpolymer has a molecular weight distribution (MWD or Mw/Mn) from 1 to 7, or from 1 to 5, or from 1.5 to 5, or from 2 to 4.

The ethylene/alpha-olefin/diene interpolymer may have the following metals content in accordance with the methods disclosed herein or similar methods. In certain embodiments, the ethylene/alpha-olefin/diene interpolymer has a vanadium content of, or comprises vanadium in an amount of, less than or equal to 0.4 ppm, or less than or equal to 0.3 ppm.

In certain embodiments, the ethylene/alpha-olefin/diene interpolymer has a titanium content of, or comprises titanium in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a zirconium content of, or comprises zirconium in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a hafnium content of, or comprises hafnium in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a Group 4 metal content of, or comprises a Group 4 metal in an amount of, greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer comprises titanium, zirconium, and/or hafnium in an amount of greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer has a vanadium content of less than or equal to 0.4 ppm or less than or equal to 0.3 ppm or a Group 4 metal content of greater than or equal to 0.3 ppm, or greater than or equal to 0.4 ppm, or greater than or equal to 0.5 ppm, or greater than or equal to 0.6 ppm.

In certain embodiments, the ethylene/alpha-olefin/diene interpolymer is absent a heteroatom. The term "heteroatom," as used herein, is an atom other than carbon or hydrogen. The heteroatom can be a non-carbon atom from Groups IV, V, VI and VII of the Periodic Table. Non-limiting examples of heteroatoms include: F, N, O, P, B, S, and Si.

The ethylene/alpha-olefin/diene interpolymer of the present disclosure may comprise two or more embodiments as described herein or may be any combination of embodiments described herein.

Fumed Alumina

The curable composition of the present disclosure further comprises (B) a fumed alumina. The fumed alumina (aluminum oxide) is a type of synthetic alumina. As a synthetic alumina, the fumed alumina of the present disclosure has a high degree of chemical purity and a high specific surface area. In further embodiments, the fumed alumina may be prepared by flame hydrolysis processes known in the art, such as processes similar to the AEROSIL® process. The flame hydrolysis processes for preparing the fumed alumina can be controlled by varying the concentration of the reactants, the flame temperature, and certain dwell times. This will affect the particle size, particle size distribution, specific surface area, and the surface properties of the fumed alumina products. In other words, different fumed alumina products can be made depending on how the process is controlled.

The fumed alumina particles prepared by flame hydrolysis processes are by nature hydrophilic unless specifically treated. To form hydrophobic fumed alumina particles, the hydrophilic fumed alumina particles are subjected to chemical post-treatment with a hydrophobic agent. Suitable hydrophobic agents include but are not limited to organosilane compounds, such as alkoxysilanes, silazanes, and siloxanes. The term "hydrophobic-treated fumed alumina," as used herein, is fumed alumina in particle form, with a hydrophobic agent bonded to the particle surface by way of one or more oxygen covalent bonds.

In certain embodiments, the fumed alumina of the present disclosure is hydrophilic fumed alumina. In further embodiments, the fumed alumina of the present disclosure is hydrophobic-treated fumed alumina. The fumed alumina of the present disclosure may be in the thermodynamically stable alpha form or the metastable gamma form, including the gamma, delta, and theta forms.

In certain embodiments, the fumed alumina has a specific surface area (BET) from greater than 50 $m^2/g$ to less than 200 $m^2/g$. In certain embodiments, the fumed alumina has a specific surface area (BET) from 55 $m^2/g$ to 150 $m^2/g$, or from 60 $m^2/g$ to 140 $m^2/g$, or from 65 $m^2/g$ to 130 $m^2/g$. In further embodiments, the fumed alumina has a specific surface area (BET) of 55 $m^2/g$, or 60 $m^2/g$, or 65 $m^2/g$, or 70 $m^2/g$, or 75 $m^2/g$, or 80 $m^2/g$, or 85 $m^2/g$ to 95 $m^2/g$, or 100 $m^2/g$, or 105 $m^2/g$, or 110 $m^2/g$, or 115 $m^2/g$, or 120 $m^2/g$, or 130 $m^2/g$, or 140 $m^2/g$, or 150 $m^2/g$, or less than 200 $m^2/g$.

Non-limiting examples of hydrophilic fumed alumina are those available as AEROXIDE® Alu 65 and Alu 130 from Evonik Industries. Non-limiting examples of hydrophobic-treated fumed alumina are those available as AEROXIDE® Alu C from Evonik Industries.

The fumed alumina of the present disclosure may be a blend of a hydrophilic fumed alumina and a hydrophobic-treated fumed alumina or may be blend of more than hydrophilic fumed alumina.

The fumed alumina of the present disclosure may be any combination of embodiments disclosed herein.

Silane Compound

The curable composition of the present disclosure further comprises (C) a silane compound. In certain embodiments, the silane compound is a silane coupling agent that contains at least one alkoxy group. Non-limiting examples of suitable silane compounds include γ-chloropropyl trimethoxysilane, vinyl trimethoxysilane, vinyl triethoxysilane, vinyl-tris-(β-methoxy)silane, allyltrimethoxysilane, γ-methacryloxypropyl trimethoxysilane, β-(3,4-ethoxy-cyclohexyl)ethyl trimethoxysilane, γ-glycidoxypropyl trimethoxysilane, γ-mercaptopropyltrimethoxysilane, γ-aminopropyl trimethoxysilane, N-β-(aminoethyl)-γ-aminopropyl trimethoxysilane, and 3-(trimethoxysilyl)propylmethacrylate, vinyl triacetoxysilane, γ-(meth)acryloxy, propyl trimethoxysilane, and combinations thereof.

In some embodiments, the silane compound is vinyl trimethoxysilane (VTMS), or 3-(trimethoxysilyl)propyl-methacrylate (VMMS) or allyltrimethoxysilane.

UV Stabilizer

The curable composition of the present disclosure further comprises (D) a UV stabilizer. Non-limiting examples of suitable UV stabilizers include hindered phenols, phophites, hindered amine light stabilizers (HALS), UV absorbers, hindered benzoates, and combinations of these.

Suitable UV stabilizers include but are not limited to T770 available from TCI; UV 531 available from TCI; Cynergy A400, A430 and R350; Cyasorb UV-3529; Cyasorb UV-3346; Cyasorb UV-3583; Hostavin N30; Univil 4050; Univin 5050; Chimassorb UV-119; Chimas sorb 944 LD; Tinuvin 622 LD; benzophenones, benzotriazoles, triazines, and combinations of these, such as Tinuvin 328 or Cyasorb UV-1164; and the like.

In certain embodiments, the UV stabilizer is a hindered amine light stabilizer.

Crosslinking Agent

The curable composition of the present disclosure may be cured to form a crosslinked polymer composition. The crosslinked polymer composition is the reaction product of the curable composition that results from curing. Accordingly, in certain embodiments, the curable composition further comprises (E) a crosslinking agent.

Non-limiting examples of suitable crosslinking agents include peroxides; phenols; azides; aldehyde-amine reaction products; substituted ureas; substituted guanidines; substituted xanthates; substituted dithiocarbamates; sulfur-containing compounds, such as thiazoles, sulfenamides, thiuramidisulfides, paraquinonedioxime, dibenzoparaquinonedioxime, sulfur; imidazoles; silanes; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups and combinations thereof.

Suitable crosslinking agents include those that are sulfur based, such as elemental sulfur. When sulfur based curing agents are employed, accelerators and cure activators may be used as well, such as amines, disulfides, guanidines, thioureas, thiazoles, thiurams, sulfenamides, dithiocarbamates, xanthates, 4,4'-dithiodimorpholine, thiuram di-and polysulfides, alkylphenol disulfides, and 2-morpholino-di-thiobenzothiazole, tetramethylthiuram disulfide (TMTD), dipentamethylenethiuram tetrasulfide (DPTT), 2-mercapto-benzothiazole (MBT), 2-mercaptobenzothiazolate disulfide (MBTS), zinc-2-mercaptobenozothiazolate (ZMBT), zinc diethyldithiocarbamatezinc (ZDEC), zinc dibutyldithiocarbamate (ZDBC), dipentamethylenethiuram tetrasulfide (DPTT), N-t-butylbenzothiazole-2-sulfanamide (TBBS), and mixtures thereof.

Additional crosslinking agents include, but are not limited to, phenolic resins, azides, aldehyde-amine reaction products, vinyl silanes, hydrosilylation agents, substituted ureas, substituted guanidines, substituted xanthates, substituted dithiocarbamates, and combinations thereof. The crosslinking agent may be a phenolic curing agent or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"). Popular industrial catalysts are "Speier's catalyst," H2PtCl6, and Karstedt's catalyst, an alkene-stabilized platinum(0) catalyst.

In preferred embodiments, the crosslinking agent may be one or more organic peroxides including but not limited to alkyl peroxides, aryl peroxides, peroxyesters, peroxycarbonates, diacylperoxides, peroxyketals, cyclic peroxides, dialkyl peroxides, peroxy esters, peroxy dicarbonates, or combinations of two or more thereof. Examples of peroxides include but are not limited to di-tertbutyl peroxide, dicumyl peroxide, di(3,3,5-trimethyl hexanoyl)peroxide, t-butyl peroxypivalate, t-butyl peroxyneodecanoate, di(sec-butyl)peroxydicarbonate, t-amyl peroxyneodecanoate, 1,1-di-t-butyl peroxy-3,3,5-trimethylcyclohexane, t-butyl-cumyl peroxide, 2,5-dimethyl-2,5-di(tertiary-butyl-peroxyl)hexane, 1,3-bis(tertiary-butyl-peroxyl-isopropyl)benzene, or a combination thereof. An exemplary crosslinking agent is dicumyl peroxide commercially available under the tradename LUPEROX® from Arkema or the tradename TRIGONOX® from Akzo Nobel. A further exemplary crosslinking agent is VAROX® DBPH-50 from Vanderbilt Chemicals. When the crosslinking agent is a peroxide, certain processing aids and cure activators such as stearic acid and ZnO may also be used.

Further examples of suitable organic peroxides include but are not limited to dicumyl peroxide; lauryl peroxide; benzoyl peroxide; tertiary butyl perbenzoate; di(tertiary-butyl) peroxide; cumene hydroperoxide; 2,5-dimethyl-2,5-di(t-butyl-peroxy)hexyne-3; 2,-5-di-methyl-2,5-di(t-butyl-peroxy)hexane; tertiary butyl hydroperoxide; isopropyl percarbonate; alpha,alpha'-bis(tertiary-butylperoxy)diisopropylbenzene; t-butylperoxy-2-ethylhexyl-monocarbonate; 1,1-bis(t-butylperoxy)-3,5,5-trimethyl cyclohexane; 2,5-dimethyl-2,5-dihydroxyperoxide; t-butylcumylperoxide; alpha,alpha'-bis(t-butylperoxy)-p-diisopropyl benzene; bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(tbutylperoxy)-2,5-dimethylhexane; 2,5-bis(t-butylperoxy)-2,5-dimethylhexyne-3,1,1-bis(tbutylperoxy)-3,3,5-trimethylcyclohexane; 2,5-di(t-amyl peroxy)-2,5-dimethylhexane; isopropylcumyl cumylperoxide; butyl 4,4-di(tertbutylperoxy) valerate; di(isopropylcumyl) peroxide; 2,5-di-(t-butylperoxy)-2,5-diphenylhexane; bis(alpha-methylbenzyl) peroxide; benzoyl peroxide; t-butyl perbenzoate; 3,6,9-triethyl-3,6,9-trimethyl-1,4,7-triperoxonane; bis(t-butylperoxy)-diisopropylbenzene; di-2-t-butylperoxy isopropyl benzene; and combinations thereof.

Non-limiting examples of suitable commercially available organic peroxides include those available from AkzoNobel under the tradename TRIGONOX®, and those available from Arkema under the tradename LUPEROX®, such as LUPEROX® F40P.

As further discussed below, when peroxide based curing agents are used, co-activators or co-agents may be used in combination therewith. Suitable coagents include but are not limited to trimethylolpropane triacrylate (TMPTA), trimethylolpropane trimethacrylate (TMPTMA), triallyl cyanurate (TAC), triallyl isocyanurate (TALC), and 1,4-phenylenedimaleimide (available from TCI Chemicals).

When a crosslinking agent is used, the cross-linking can be induced by activating the cross-linking agent in the curable composition. The crosslinking agent can be activated by exposing it to a temperature above its decomposition temperature. Temperatures range from 50° C. to 300° C., such as 80° C. to 275° C. Time can be determined by one of ordinary skill in the art depending on polymers and cure components selected.

Alternatively, the crosslinking agent can be activated by exposing it to a radiation that causes the generation of free radicals from the crosslinking agent. Non-limiting examples of suitable radiation include UV or visible radiation, electron beam or beta ray, gamma rays, X-rays, or neutron rays. Radiation is believed to activate the cross-linking by generating radicals in the polymer which may subsequently combine and cross-link. Radiation dosage depends upon many factors and can be determined by those skilled in the art. UV or visible radiation activation can occur when the cross-linking agent is a peroxide photoinitiator, such as dibenzoyl peroxide, cumene hydroperoxide, di-t-butyl peroxide, diacetyl peroxide, hydrogen peroxide, peroxydisulfates, and 2,2-bis(terbutylperoxy)-2,5-dimethylhexane.

In some embodiments, dual cure systems, which comprises at least two activation methods, may be effectively employed, such as combinations selected from heat, moisture cure, and radiation. For instance, it may be desirable to employ a peroxide crosslinking agent in conjunction with a silane crosslinking agent, a peroxide crosslinking agent in conjunction with radiation, a sulfur-containing cross-linking agent in conjunction with a silane crosslinking agent, or the like. Those skilled in the art will be readily able to select the amount of crosslinking agent, based on the desired cross-linking level, the characteristics of the polymer such as molecular weight, molecular weight distribution, comonomer content, the presence of cross-linking enhancing coagents, other additives and the like.

Crosslinking Co-Agent

In certain embodiments wherein the curable composition of the present disclosure comprises a peroxide crosslinking agent, the curable composition may further comprise (F) a crosslinking co-agent. The crosslinking co-agent can be any one, or a mixture, of co-agents, including, but not limited to, an ester, ether, ketone, cyanurate, isocyanurate, phosphate, ortho formate, aliphatic or aromatic ether containing at least 2, and preferably 3, unsaturated groups such as allyl, vinyl or acrylate. The number of carbon atoms in the co-agent can be in the range of 9 to 40 or more, and is preferably 9 to 20.

Specific examples of co-agents include, but are not limited to, trimethylolpropane trimethacrylate (TRIM); triallyl cyanurate (TAC); triallyl-1,3,5-triazine-2,4,6(1H,3H,5H)-trione also known as triallyl isocyanturate (TALC); hexaallyl melamine; triallyl phosphate (TAP); triallyl ortho formate; tetra-allyloxy-ethane; triallyl benzene-1,3,5- tricarboxylate; diallyl phthalate; diallyl terephthalate; zinc dimethacrylate; ethoxylated bisphenol A dimethacrylate; methacrylate terminated monomer with average chain length of C14 or C15; pentaerythritol tetraacrylate; depentaerythritol pentaacrylate; pentaerythritol triacrylate; dimethylolpropane tetraacrylate; ethoxylated trimethylolpropane triacrylate; trimethylolpropane triacrylate; 2,4,6-triallyl-1,3,5-trione; 2,4-diphentyl-4-methyl-1-pentene; triallyl trimellitate (TATM); 3,9-divinyl-2,4,8,10-tetra-oxaspiro[5.5]undecane (DVS); alpha-methyl styrene dimer (AMSD); 1,2 polybutadiene; divinyl benzene; trimethylolpropane trimethacrylate; polyethylene glycol dimethacrylate; ethylene glycol dimethacrylate; allyl methacrylate; N N'-m-phenylene bismaleimide; toluene bismaleimide-p-quinone dioxime; nitrobenzene; diphenylguanidine; and combinations thereof.

In certain embodiments, the crosslinking co-agent may be selected from the group consisting of TRIM, TAIC, TAC, TAP, vinyl cyclic siloxanes, and combinations thereof.

Additive Component

The curable composition of the present disclosure may comprise one or more additives. Accordingly, the curable composition may comprise (G) an additive component. Suitable additives that may comprise the additive component include but are not limited to metal oxides, antioxidants, fillers, UV stabilizers, flame retardants, plasticizers or oils, colorants or pigments, tackifiers, reinforcing agents, fatty acids and salts thereof, ignition resistant additives, scorch inhibitors, stabilizers, blowing agents, lubricants, processing aids, extrusion aids, nucleating agents, scavengers, waxes, curing additives, accelerants, and combinations thereof.

Metal oxides include but are not limited to oxides of silicon, calcium, zinc, iron, titanium, and aluminum. Fillers include, but are not limited to, carbon black; silicates of aluminum, magnesium, calcium, sodium, potassium and mixtures thereof; carbonates of calcium, magnesium and mixtures thereof; sulfates of calcium, barium, and lead; alumina trihydrate; magnesium hydroxide; phenol-formaldehyde, polystyrene, and poly(alphamethyl)-styrene resins, natural fibers, synthetic fibers, and the like.

Plasticizers or oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, 2,2,4-trimethyl-1,2-dihydroquinoline, and the like.

Curable Composition

The present disclosure relates to a curable composition comprising: (A) a polyolefin; (B) a fumed alumina; (C) a silane compound; and (D) a UV stabilizer. Optionally, the curable composition may further comprise (E) a crosslinking agent, (F) a crosslinking co-agent, and/or (G) an additive component.

The (A) polyolefin may be present in the curable composition in amount from 80 wt % to 99.99 wt %, or from 84 wt % to 99.97 wt %, or from 90 wt % to 99.97 wt %, or from 95 wt % to 99.97 wt %, based on the total weight of the curable composition.

The (B) fumed alumina may be present in the curable composition in an amount from 0.01 wt % to 5 wt %, or from 0.1 wt % to 3 wt %, or from 0.5 wt % to 2 wt %, or from 0.5 wt % to 1 wt %, based on the total weight of the curable composition.

The (C) silane compound may be present in the curable composition in an amount from 0.01 wt % to 5 wt %, or from 0.1 wt % to 3 wt %, or from 0.1 wt % to 2 wt %, based on the total weight of the curable composition.

The (D) UV stabilizer may be present in the curable composition in an amount from 0.01 wt % to 5 wt %, or from 0.01 wt % to 3 wt %, or from 0.01 wt % to 1 wt %, based on the total weight of the curable composition.

The (E) crosslinking agent may be present in the curable composition in an amount from 0 wt % to 5 wt %, or from 0.01 wt % to 5 wt %, or from 0.5 wt % to 5 wt %, or from 1 wt % to 3 wt %, based on the total weight of the curable composition.

The (F) crosslinking co-agent may be present in the curable composition in an amount from 0 wt % to 5 wt %, or from 0.01 wt % to 5 wt %, or from 0.05 wt % to 3 wt %, or from 0.1 wt % to 1 wt %, based on the total weight of the curable composition.

The (G) additive component may be present in the curable composition in an amount from 0 wt % to 10 wt %, or from 0.01 wt % to 10 wt %, or from 0.05 wt % to 8 wt %, or from 0.1 wt % to 5 wt %, or from 0.5 wt % to 3 wt %, based on the total weight of the curable composition.

The (A) polyolefin may blended with one or more polymers. Accordingly, the curable composition of the present disclosure (as well as the crosslinked polymer composition comprising the reaction product of the curable composition) may further comprise one or more polymers, including but not limited to unsaturated polyolefins (another EPDM, polybutadiene, etc.), saturated polyolefins (PE, PP, ethylene/alpha-olefin interpolymers, propylene/alpha-olefin interpolymers, olefin block copolymers, etc.), other elastomers (SBCs, PVC, EVA, etc.) and other engineering thermoplastics (styrenics, polyamides, polyesters, etc.).

In certain embodiments, the polyolefin is not blended with other polymers. In certain embodiments, the curable composition is absent (or does not comprise of) any polymers other than the (A) polyolefin.

The curable composition of the present disclosure may be cured to form a crosslinked polymer composition. The crosslinked polymer composition of the present disclosure is the reaction product of the curable composition.

The curable composition or the crosslinked polymer composition may have the following properties in accordance with the methods disclosed herein or similar methods, where volume resistivity is at room temperature. In certain embodiments, the curable composition or the crosslinked polymer composition has a volume resistivity of greater than 1.0E+15 ohm.cm, or greater than 5.0E+15 ohm.cm, or greater than 1.0E+16 ohm.cm, or greater than or equal to 2.5E+16 ohm.cm, or greater than or equal to 5.0E+16 ohm.cm, or greater than or equal to 6.0E+16 ohm.cm, or greater than or equal to 8.0E+16 ohm.cm, or greater than or equal to 1.0E+17 ohm.cm, or greater than or equal to 1.30E+17 ohm.cm, or greater than or equal to 3.0E+17 ohm.cm, or greater than or equal to 5.0E+17 ohm.cm, or greater than or equal to 1.0E+18 ohm.cm, or greater than or equal to 5.0E+18 ohm.cm, or greater than or equal to 1.0E+19 ohm.cm.

In certain embodiments, the curable composition or the crosslinked polymer composition has a volume resistivity from greater than 1.0E+15 ohm.cm to 1.0E+19 ohm.cm, or from greater than 1.0E+15 ohm.cm to 5.0E+18 ohm.cm, or from greater than 1.0E+15 ohm.cm to 1.0E+18 ohm.cm, or from greater than 1.0E+15 ohm.cm to 5.0E+17 ohm.cm, or from greater than 1.0E+15 ohm.cm to 4.0E+17 ohm.cm, or from greater than 1.0E+15 ohm.cm to 3.0E+17 ohm.cm, or from greater than 5.0E+15 ohm.cm to 2.0E+17 ohm.cm, or from greater than 1.0E+16 ohm.cm to 2.0E+17 ohm.cm.

In some embodiments, the curable composition or the crosslinked polymer composition has, in accordance with the methods disclosed herein or similar methods, a dissipation factor from zero to less than 10%, or less than 8%, or less than 6%, or less than 4%, or less than 2%, or less than or equal to 1%, or less than or equal to 0.7%, or less than or equal to 0.6%, or less than or equal to 0.5%, or less than or equal to 0.4%, or less than or equal to 0.3%, or less than or equal to 0.2%, or less than or equal to 0.16%, or less than or equal to 0.15%, or less than or equal to 0.1%, or less than or equal to 0.078%.

Each of the curable composition and the crosslinked polymer composition may have any combination of embodiments described herein.

Articles and Applications

The curable composition or crosslinked polymer composition of the present disclosure may be used to prepare articles by any one of a number of conventional processes and apparatuses. Illustrative processes include, but are not limited to, extrusion, calendaring, compression molding, and other typical thermoset material forming process. For example, articles can be prepared by extrusion, extrusion followed by additional thermal treatment, low pressure molding, compression molding, and the like.

Articles prepared with the curable composition or crosslinked polymer composition of the present disclosure include, but are not limited to, sheets, films, molded goods, fibers, and extruded parts. Additional articles include, but are not limited to, soft touch goods, automotive parts, adhesives, piping, weather strips, belts, hoses, building profiles, wire and cable jacketing and components, flooring materials, gaskets and profiles, tires and tire components, computer parts, building materials, coatings, woodworking, photovoltaic articles, and footwear components. A person of ordinary skill in the art can readily augment this list without undue experimentation.

The article may have the following VR properties in accordance with the methods disclosed herein and similar methods. In certain embodiments, an article made from (or comprising) the curable composition or the crosslinked polymer composition has a volume resistivity of greater than 1.0E+15 ohm.cm, or greater than 5.0E+15 ohm.cm, or greater than 1.0E+16 ohm.cm, or greater than or equal to 2.5E+16 ohm.cm, or greater than or equal to 5.0E+16 ohm.cm, or greater than or equal to 6.0E+16 ohm.cm, or greater than or equal to 8.0E+16 ohm.cm, or greater than or equal to 1.0E+17 ohm.cm, or greater than or equal to 1.30E+17 ohm.cm, or greater than or equal to 3.0E+17 ohm.cm, or greater than or equal to 5.0E+17 ohm.cm, or greater than or equal to 1.0E+18 ohm.cm, or greater than or equal to 5.0E+18 ohm.cm, or greater than or equal to 1.0E+19 ohm.cm.

In certain embodiments, an article made from (or comprising) the curable composition or the crosslinked polymer composition has a volume resistivity from greater than 1.0E+15 ohm.cm to 1.0E+19 ohm.cm, or from greater than 1.0E+15 ohm.cm to 5.0E+18 ohm.cm, or from greater than 1.0E+15 ohm.cm to 1.0E+18 ohm.cm, or from greater than 1.0E+15 ohm.cm to 4.0E+17 ohm.cm, or from greater than 1.0E+15 ohm.cm to 5.0E+17 ohm.cm, or from greater than 1.0E+15 ohm.cm to 3.0E+17 ohm.cm, from greater than 5.0E+15 ohm.cm to 2.0E+17 ohm.cm, or from greater than 1.0E+16 ohm.cm to 2.0E+17 ohm.cm.

In some embodiments, an article made from (or comprising) the curable composition or the crosslinked polymer composition has a dissipation factor from zero to less than 10%, or less than 8%, or less than 6%, or less than 4%, or less than 2%, or less than or equal to 1%, or less than or equal to 0.7%, or less than or equal to 0.6%, or less than or equal to 0.5%, or less than or equal to 0.4%, or less than or equal to 0.3%, or less than or equal to 0.2%, or less than or equal to 0.16%, or less than or equal to 0.15%, or less than or equal to 0.1%, or less than or equal to 0.078%.

Specific embodiments of the present disclosure include but are not limited to the following:

1. A curable composition comprising: (A) a polyolefin; (B) a fumed alumina; (C) a silane compound; and (D) a UV stabilizer.
2. The curable composition of embodiment 1, further comprising (E) a crosslinking agent.
3. The curable composition of embodiment 1 or 2, further comprising (F) a crosslinking co-agent and/or (G) an additive component.
4. The curable composition of any of the previous embodiments, comprising:
    (A) from 80 wt % to 99.99 wt %, or from 84 wt % to 99.97 wt %, or from 90 wt % to 99.97 wt %, or from 95 wt % to 99.97 wt % of the polyolefin, based on the total weight of the curable composition;
    (B) from 0.01 wt % to 5 wt %, or from 0.1 wt % to 3 wt %, or from 0.5 wt % to 2 wt %, or from 0.5 wt % to 1 wt % of the fumed alumina, based on the total weight of the curable composition;
    (C) from 0.01 wt % to 5 wt %, or from 0.1 wt % to 3 wt %, or from 0.1 wt % to 2 wt % of the silane compound, based on the total weight of the curable composition;
    (D) from 0.01 wt % to 5 wt %, or from 0.01 wt % to 3 wt %, or from 0.01 wt % to 1 wt % of the UV stabilizer, based on the total weight of the curable composition;
    (E) from 0 wt % to 5 wt %, or from 0.01 wt % to 5 wt %, or from 0.1 wt % to 5 wt %, or from 1 wt % to 3 wt % of the crosslinking agent, based on the total weight of the curable composition.
    (F) from 0 wt % to 5 wt %, or from 0.01 wt % to 5 wt %, or from 0.05 wt % to 3 wt %, or from 0.1 wt % to 1 wt % of the crosslinking co-agent, based on the total weight of the curable composition; and (G) from 0 wt % to 10 wt %, or from 0.01 wt % to 10 wt %, or from 0.05 wt % to 8 wt %, or from 0.1 wt % to 5 wt %, or from 0.5 wt % to 3 wt % of the additive component, based on the total weight of the curable composition.

5. The curable composition of any of the previous embodiments, wherein the polyolefin is selected from the group consisting of an ethylene/alpha-olefin/diene interpolymer, an ethylene/alpha-olefin copolymer, a propylene/alpha-olefin copolymer, and an ethylene/alpha-olefin multi-block interpolymer.

6. The curable composition of any of the previous embodiments, wherein the alpha-olefin is selected from the group consisting of ethylene, propylene, 1-butene, 4-methyl-1-pentene, 1-hexene, 1-octene, 1-decene, 1-dodecene, 1-tetradecene, 1-hexadecene, and 1-octadecene.

7. The curable composition of any of the previous embodiments, wherein the polyolefin is an ethylene/alpha-olefin/diene interpolymer.

8. The curable composition of any of the previous embodiments, wherein the polyolefin is an ethylene/propylene/diene interpolymer.

9. The curable composition of any of the previous embodiments, wherein the polyolefin is an ethylene/propylene/ENB interpolymer.

10. The curable composition of any of the previous embodiments, wherein the polyolefin comprises vanadium in an amount of less than or equal to 0.4 ppm or less than or equal to 0.3 ppm.

11. The curable composition of any of the previous embodiments, wherein the polyolefin comprises a Group 4 metal in an amount of greater than or equal to 0.3 ppm, or greater than or equal to 0.4 ppm, or greater than or equal to 0.5 ppm, or greater than or equal to 0.6 ppm.

12. The curable composition of any of the previous embodiments, wherein the polyolefin comprises titanium in an amount of greater than or equal to 0.3 ppm, or greater than or equal to 0.4 ppm, or greater than or equal to 0.5 ppm, or greater than or equal to 0.6 ppm.

13. The curable composition of any of the previous embodiments, wherein the polyolefin comprises zirconium in an amount of greater than or equal to 0.3 ppm, or greater than or equal to 0.4 ppm, or greater than or equal to 0.5 ppm, or greater than or equal to 0.6 ppm.

14. The curable composition of any of the previous embodiments, wherein the polyolefin comprises hafnium in an amount of greater than or equal 0.3 ppm, or greater than or equal to 0.4 ppm, or greater than or equal to 0.5 ppm, or greater than or equal to 0.6 ppm.

15. The curable composition of any of the previous embodiments, wherein the polyolefin comprises titanium, zirconium, and/or hafnium in an amount of greater than or equal 0.3 ppm, or greater than or equal to 0.4 ppm, or greater than or equal to 0.5 ppm, or greater than or equal to 0.6 ppm.

16. The curable composition of any of the previous embodiments, wherein the polyolefin has, in accordance with ASTM D1646, a Mooney viscosity (ML 1+4 at 125° C.) from greater than 0 to 100 MU, or from 5 MU to 100 MU, or from 15 MU to 100 MU, or from 15 MU to 99 MU, or from 15 MU to 90 MU, or from 15 MU to 80 MU, or from 15 MU to 70 MU, or from 15 MU to 60 MU, or from 15 MU to 50 MU, or from 18 MU to 45 MU, or from 18 MU to 40 MU.

17. The curable composition of any of the previous embodiments, wherein the polyolefin has:
a density, in accordance with ASTM D792, Method B, from 0.850 g/cc to 0.920 g/cc, or from 0.860 g/cc to 0.910 g/cc, or from 0.860 g/cc to 0.900 g/cc, or from 0.860 g/cc to 0.890 g/cc, or from 0.860 g/cc to 0.880 g/cc;
a melt index, in accordance with ASTM D1238 at 190° C./2.16 kg, from 0.1 to 1,000 dg/min, or from 0.1 to 500 dg/min, or from 0.1 to 100 dg/min, or from 0.1 to 75 dg/min, or from 0.1 to 50 dg/min, or from 0.1 to 25 dg/min, or from 0.5 to 15 dg/min, or from 1 to 10 dg/min; and/or
a melt flow rate, in accordance with ASTM D1238 at 230° C./2.16 kg, from 0.1 to 1,000 dg/min, or from 0.1 to 500 dg/min, or from 0.1 to 100 dg/min, or from 0.1 to 75 dg/min, or from 0.1 to 50 dg/min, or from 0.1 to 25 dg/min, or from 0.5 to 15 dg/min, or from 1 to 10 dg/min.

18. The curable composition of any of the previous embodiments, wherein the polyolefin comprises from 40 to 80 wt %, or from 50 to 80 wt %, or from 55 to 70 wt % of polymerized ethylene.

19. The curable composition of any of the previous embodiments, wherein the polyolefin comprises from zero to 10 wt %, or from 0.5 wt % to 9 wt %, or from 0.5 wt % to 8.5 wt % of polymerized diene.

20. The curable composition of any of the previous embodiments, wherein the polyolefin has a molecular weight distribution (MWD or Mw/Mn) from 1 to 7, or from 1 to 5, or from 1.5 to 5, or from 2 to 4.

21. The curable composition of any of the previous embodiments, wherein the fumed alumina is hydrophilic.

22. The curable composition of any of the previous embodiments, wherein the fumed alumina has a specific surface area (BET) from greater than 50 $m^2/g$ to less than 200 $m^2/g$, or from 55 $m^2/g$ to 150 $m^2/g$, or from 60 $m^2/g$ to 140 $m^2/g$, or from 65 $m^2/g$ to 130 $m^2/g$.

23. The curable composition of any of the previous embodiments, wherein the silane compound is selected from the group consisting of vinyl trimethoxysilane (VTMS), 3-(trimethoxysilyl)propylmethacrylate (VMMS), and allyltrimethoxysilane.

24. The curable composition of any of the previous embodiments, wherein the UV stabilizer is a hindered amine light stabilizer.

25. The curable composition of any of embodiments 2-24, wherein the crosslinking agent is an organic peroxide.

26. The curable composition of any of the previous embodiments, wherein the curable composition has a volume resistivity of greater than 1.0E+15 ohm.cm, or greater than 5.0E+15 ohm.cm, or greater than 1.0E+16 ohm.cm, or greater than or equal to 2.5E+16 ohm.cm, or greater than or equal to 5.0E+16 ohm.cm, or greater than or equal to 6.0E+16 ohm.cm, or greater than or equal to 8.0E+16 ohm.cm, or greater than or equal to 1.0E+17 ohm.cm, or greater than or equal to 1.30E+17 ohm.cm, or greater than or equal to 3.0E+17 ohm.cm, or greater than or equal to 5.0E+17 ohm.cm, or greater than or equal to 1.0E+18 ohm.cm, or greater than or equal to 5.0E+18 ohm.cm, or greater than or equal to 1.0E+19 ohm.cm.

27. The curable composition of any of the previous embodiments, wherein the curable composition has a volume resistivity from greater than 1.0E+15 ohm.cm to 1.0E+19 ohm.cm, or from greater than 1.0E+15 ohm.cm to 5.0E+18 ohm.cm, or from greater than 1.0E+15 ohm.cm to 1.0E+18 ohm.cm, or from greater than 1.0E+15 ohm.cm to 5.0E+17 ohm.cm, or from greater than 1.0E+15 ohm.cm to 4.0E+17 ohm.cm, or from greater than 1.0E+15 ohm.cm to 3.0E+17 ohm.cm, or from greater than 5.0E+15 ohm.cm to 2.0E+17 ohm.cm, or from greater than 1.0E+16 ohm.cm to 2.0E+17 ohm.cm.

28. The curable composition of any of the previous embodiments, wherein the curable composition has a dissipation factor from zero to less than 10%, or less than 8%, or less than 6%, or less than 4%, or less than 2%, or less than or equal to 1%, or less than or equal to 0.7%, or less than or equal to 0.6%, or less than or equal to 0.5%, or less than or equal to 0.4%, or less than or equal to 0.3%, or less than or equal to 0.2%, or less than or equal to 0.16%, or less than or equal to 0.15%, or less than or equal to 0.1%, or less than or equal to 0.078%.

29. A crosslinked polymer composition comprising the curable composition of any of the previous embodiments.

30. A crosslinked polymer composition that is the reaction product of the curable composition of any of embodiments 1-28.

31. A crosslinked polymer composition comprising the reaction product of the curable composition of any of embodiments 1-28.

32. The crosslinked polymer composition of any of embodiments 29-31, wherein the crosslinked polymer composition has a volume resistivity of greater than 1.0E+15 ohm.cm, or greater than 5.0E+15 ohm.cm, or greater than 1.0E+16 ohm.cm, or greater than or equal to 2.5E+16 ohm.cm, or greater than or equal to 5.0E+16 ohm.cm, or greater than or equal to 6.0E+16 ohm.cm, or greater than or equal to 8.0E+16 ohm.cm, or greater than or equal to 1.0E+17 ohm.cm, or greater than or equal to 1.30E+17 ohm.cm, or greater than or equal to 3.0E+17 ohm.cm, or greater than or equal to 5.0E+17 ohm.cm, or greater than or equal to 1.0E+18 ohm.cm, or greater than or equal to 5.0E+18 ohm.cm, or greater than or equal to 1.0E+19 ohm.cm.

33. The crosslinked polymer composition of any of embodiments 29-32, wherein the crosslinked polymer composition has a volume resistivity from greater than 1.0E+15 ohm.cm to 1.0E+19 ohm.cm, or from greater than 1.0E+15 ohm.cm to 5.0E+18 ohm.cm, or from greater than 1.0E+15 ohm.cm to 1.0E+18 ohm.cm, or from greater than 1.0E+15 ohm.cm to 5.0E+17 ohm.cm, or from greater than 1.0E+15 ohm.cm to 3.0E+17 ohm.cm, or from greater than 1.0E+15 ohm.cm to 4.0E+17 ohm.cm, or from greater than 5.0E+15 ohm.cm to 2.0E+17 ohm.cm or from greater than 1.0E+16 ohm.cm to 2.0E+17 ohm.cm.

34. The crosslinked polymer composition of any of embodiments 29-33, wherein the crosslinked polymer composition has a dissipation factor from zero to less than 10%, or less than 8%, or less than 6%, or less than 4%, or less than 2%, or less than or equal to 1%, or less than or equal to 0.7%, or less than or equal to 0.6%, or less than or equal to 0.5%, or less than or equal to 0.4%, or less than or equal to 0.3%, or less than or equal to 0.2%, or less than or equal to 0.16%, or less than or equal to 0.15%, or less than or equal to 0.1%, or less than or equal to 0.078%.

35. An article comprising the curable composition of any of embodiments 1-28.

36. An article made from the curable composition of any of embodiments 1-28.

37. An article comprising the crosslinked polymer composition of any of embodiments 29-34.

38. An article made from the crosslinked polymer composition of any of embodiments 29-34.

39. The article of any of embodiments 35-38, wherein the article has a volume resistivity of greater than 1.0E+15 ohm.cm, or greater than 5.0E+15 ohm.cm, or greater than 1.0E+16 ohm.cm, or greater than or equal to 2.5E+16 ohm.cm, or greater than or equal to 5.0E+16 ohm.cm, or greater than or equal to 6.0E+16 ohm.cm, or greater than or equal to 8.0E+16 ohm.cm, or greater than or equal to 1.0E+17 ohm.cm, or greater than or equal to 1.30E+17 ohm.cm, or greater than or equal to 3.0E+17 ohm.cm, or greater than or equal to 5.0E+17 ohm.cm, or greater than or equal to 1.0E+18 ohm.cm, or greater than or equal to 5.0E+18 ohm.cm, or greater than or equal to 1.0E+19 ohm.cm.

40. The article of any of embodiments 35-39, wherein the article has a volume resistivity from greater than 1.0E+15 ohm.cm to 1.0E+19 ohm.cm, or from greater than 1.0E+15 ohm.cm to 5.0E+18 ohm.cm, or from greater than 1.0E+15 ohm.cm to 1.0E+18 ohm.cm, or from greater than 1.0E+15 ohm.cm to 5.0E+17 ohm.cm, or from greater than 1.0E+15 ohm.cm to 3.0E+17 ohm.cm, or from greater than 1.0E+15 ohm.cm to 4.0E+17 ohm.cm, or from greater than 5.0E+15 ohm.cm to 2.0E+17 ohm.cm, or from greater than 1.0E+16 ohm.cm to 2.0E+17 ohm.cm.

41. The article of any of embodiments 35-40, wherein the article has a dissipation factor from zero to less than 10%, or less than 8%, or less than 6%, or less than 4%, or less than 2%, or less than or equal to 1%, or less than or equal to 0.7%, or less than or equal to 0.6%, or less than or equal to 0.5%, or less than or equal to 0.4%, or less than or equal to 0.3%, or less than or equal to 0.2%, or less than or equal to 0.16%, or less than or equal to 0.15%, or less than or equal to 0.1%, or less than or equal to 0.078%.

42. The article of any of embodiments 35-41, wherein the article is a film.

EXAMPLES

Materials

The materials used in the following examples are described below.

NORDEL™ 4725P ("EPDM 1"): A ethylene propylene diene interpolymer (made via non-Z-N catalysts) available from The Dow Chemical Company having: a density of 0.880 g/cc (ASTM D792); a Mooney Viscosity (ML 1+4 at 125° C.) of 25 MU (ASTM D1646); an ethylene content of 68/70 wt % (ASTM D3900); and an ENB content of 4.9 wt % (ASTM D6047).

NORDEL™ 3720P ("EPDM 2"): An ethylene propylene diene interpolymer (made via non-Z-N catalysts) available from The Dow Chemical Company having: a density of 0.880 g/cc (ASTM D792); a Mooney Viscosity (ML 1+4 at 125° C.) of 20 MU (ASTM D1646); an ethylene content of 70 wt % (ASTM D3900); and an ENB content of 0.5/0.6 wt % (ASTM D6047).

NORDEL™ 6530 XFC ("EPDM 3"): An ethylene propylene diene interpolymer (made via non-Z-N catalysts)

available from The Dow Chemical Company having: a density of 0.880 g/cc (ASTM D792); a Mooney Viscosity (ML 1+4 at 125° C.) of 30 MU (ASTM D1646); an ethylene content of 55 wt % (ASTM D3900); and an ENB content of 8.5 wt % (ASTM D6047).

INFUSE™ 9530 ("OBC"): An ethylene/alpha-olefin multiblock interpolymer or olefin block copolymer (made via non-Z-N catalysts) available from The Dow Chemical Company having: a density of 0.887 g/cc (ASTM D792) and a melt index, at 190° C./2.16 kg, of 5 dg/min (ASTM D1238).

ENGAGE™ 8200 ("POE 1"): An ethylene/1-octene copolymer (made via non-Z-N catalysts) available from The Dow Chemical Company having: a density of 0.870 g/cc (ASTM D792) and a melt index, at 190° C./2.16 kg, of 5 dg/min (ASTM D1238).

VERSIFY™ 2300 ("POE 2"): A propylene/ethylene copolymer (made via non-Z-N catalysts) available from The Dow Chemical Company having: a density of 0.867 g/cc (ASTM D792) and a melt flow rate, at 230° C./2.16 kg, of 2 dg/min (ASTM D1238).

"Alumina": Fumed alumina available as Aeroxide® Alu 130 from Evonik Industries.

"VMMS": 3-(trimethoxysilyl)propylmethacrylate.

"VTMS": vinyl trimethoxysilane.

"HALS 1": bis(2,2,6,6-tetramethyl-4-piperidyl) Sebacate, a hindered amine light stabilizer available as 770 from TCI.

"HALS 2": A hindered amine light stabilizer available as Uvinul® 4050 FF from BASF.

"Peroxide": dicumyl peroxide available as Luperox® DC from Arkema.

The residual metal content of the neat resins of EPDM 1 to 3 were measured according to the methods described herein and present in Table 1. "ND" means "not detectable," which indicates a measurement below the detection limit for that metal (0.3 ppm for Zr and 0.4 ppm for V).

Sample Preparation

Each of the comparative examples (CE1 to CE15) and inventive examples (IE1 to IE13) are prepared as described below and in accordance with the formulations of Tables 2-5.

Polyolefin was fed into a Brabender mixer at a set temperature of 100° C. with a rotor speed of 30 rpm. After around 3 minutes, the polyolefin was homogeneously heated/melted. Afterwards, all the other components, including the fumed alumina, the silane compound, and the UV stabilizer were weighed and then gradually added into the chamber. 50 rpm was employed for another 7 minutes to disperse filler and various other additives. For the examples including peroxide, peroxide was loaded into the chamber after decreasing the melt temperature below 130° C. by lowering rotor speed and using strong cooling. Further mixing was performed for 3 minutes to disperse the peroxide. The compound was collected and pressed into a flat pie for the following use.

Preparation of non-cured films: The compounds from Brabender mixing were preheated at 120° C. for 5 min, and then degassing followed by another 1 min pressing process at 120° C., followed by ramp down to room temperature. The film thickness is around 0.8 mm.

Preparation of cured films: The compounds from Brabender mixing were compression molded into 0.8 mm films. The samples were pre-compressed and then degassed first, followed by the a 20 min pressing process at 180° C. to insure the complete curing of the sample, followed by ramp down to room temperature.

The compression molded films were used for VR and DF measurements as presented in Tables 2-5.

TABLE 1

|  | EPDM 1 | EPDM 2 | EPDM 3 | POE 1 | POE 2 | OBC |
|---|---|---|---|---|---|---|
| Vanadium (ppm) | ND | ND | ND | ND | ND | ND |
| Hafnium (ppm) | ND | ND | 0.667 | ND | ND | 8 |
| Zirconium (ppm) | 0.364 | ND | ND | ND | ND | ND |

TABLE 2

| Component | CE1 | CE2 | CE3 | CE4 | CE5 | CE6 |
|---|---|---|---|---|---|---|
| Comparative Compositions (wt %) | | | | | | |
| EPDM 1 | 100 | 99 | 99.75 | 99.93 | 98.75 | 98.93 |
| EPDM 2 | — | — | — | — | — | — |
| EPDM 3 | — | — | — | — | — | — |
| Alumina | — | 1.0 | — | — | 1.0 | 1.0 |
| VMMS | — | — | 0.25 | — | 0.25 | — |
| VTMS | — | — | — | — | — | — |
| HALS 1 | — | — | — | 0.07 | — | 0.07 |
| HALS 2 | — | — | — | — | — | — |
| Peroxide | — | — | — | — | — | — |
| Total (wt %) | 100 | 100 | 100 | 100 | 100 | 100 |
| Performance Results | | | | | | |
| VR at RT (ohm · cm) | 9.37E+14 | 2.61E+14 | 2.00E+15 | 1.70E+15 | 9.89E+14 | 2.56E+15 |
| DF, % | — | — | — | — | — | — |
| Component | CE7 | CE8 | CE9 | CE10 | CE11 | CE12 |
| Comparative Compositions (wt %) | | | | | | |

TABLE 2-continued

| | | | | | | |
|---|---|---|---|---|---|---|
| EPDM 1 | 99.68 | — | — | 98.23 | — | — |
| EPDM 2 | — | — | 100 | — | 98.23 | — |
| EPDM 3 | — | 100 | — | — | — | 98.23 |
| Alumina | — | — | — | — | — | — |
| VMMS | 0.25 | — | — | — | — | — |
| VTMS | — | — | — | — | — | — |
| HALS 1 | 0.07 | — | — | — | — | — |
| HALS 2 | — | — | — | — | — | — |
| Peroxide | — | — | — | 1.77 | 1.77 | 1.77 |
| Total (wt %) | 100 | 100 | 100 | 100 | 100 | 100 |
| Performance Results | | | | | | |
| VR at RT (ohm · cm) | 3.36E+15 | 9.10E+13 | 5.75E+14 | 3.65E+15 | 4.28E+15 | 5.28E+14 |
| DF, % | — | — | — | 2.09 | 2.80 | 6.22 |

TABLE 3

| Component | IE1 | IE2 | IE3 | IE4 | IE5 | IE6 | IE7 | IE8 | IE9 | IE10 |
|---|---|---|---|---|---|---|---|---|---|---|
| Inventive Compositions (wt %) | | | | | | | | | | |
| EPDM 1 | 98.68 | 98.43 | 99.18 | 98.68 | 98.68 | — | — | 96.88 | — | — |
| EPDM 2 | — | — | — | — | — | — | 98.68 | — | 96.88 | — |
| EPDM 3 | — | — | — | — | — | 98.36 | — | — | — | 96.81 |
| Alumina | 1.0 | 1.0 | 0.5 | 1.0 | 1.0 | 1.0 | 1.0 | 1.0 | 1.0 | 1.0 |
| VMMS | 0.25 | 0.5 | 0.25 | — | 0.25 | 0.5 | 0.25 | 0.25 | 0.25 | 0.25 |
| VTMS | — | — | — | 0.25 | — | — | — | — | — | — |
| HALS 1 | 0.07 | 0.07 | 0.07 | 0.07 | — | 0.14 | 0.07 | 0.07 | 0.07 | 0.14 |
| HALS 2 | — | — | — | — | 0.07 | — | — | — | — | — |
| Peroxide | — | — | — | — | — | — | — | 1.8 | 1.8 | 1.8 |
| Total (wt %) | 100 | 100 | 100 | 100 | 100 | 100 | 100 | 100 | 100 | 100 |
| Performance Results | | | | | | | | | | |
| VR at RT (ohm · cm) | 4.70E+16 | 5.27E+16 | 6.40E+16 | 6.40E+16 | 1.32E+17 | 1.10E+16 | 5.28E+16 | 2.86E+16 | 5.59E+16 | 1.72E+16 |
| DF, % | — | — | — | — | — | — | — | 0.2 | 0.158 | 0.687 |

TABLE 4

| Comparative Compositions (wt %) | | | |
|---|---|---|---|
| Component | CE13 | CE14 | CE15 |
| POE 1 | 98.23 | — | — |
| POE 2 | — | 100 | — |
| OBC | — | — | 98.23 |
| Alumina | — | — | — |
| VMMS | — | — | — |
| HALS 1 | — | — | — |
| Peroxide | 1.77 | — | 1.77 |
| Total (wt %) | 100 | 100 | 100 |
| Performance Results | | | |
| VR at RT (ohm · cm) | 1.29E+15 | 3.34E+15 | 2.41E+15 |
| DF, % | 1.504 | — | 3.500 |

TABLE 5

| Inventive Compositions (wt %) | | | |
|---|---|---|---|
| Component | IE11 | IE12 | IE13 |
| POE 1 | 96.91 | — | — |
| POE 2 | — | 98.68 | — |
| OBC | — | — | 96.91 |
| Alumina | 1.0 | 1.0 | 1.0 |
| VMMS | 0.25 | 0.25 | 0.25 |
| HALS 1 | 0.07 | 0.07 | 0.07 |
| Peroxide | 1.77 | — | 1.77 |
| Total (wt %) | 100 | 100 | 100 |
| Performance Results | | | |
| VR at RT (ohm · cm) | 1.30E+17 | 3.82E+17 | 6.23E+15 |
| DF, % | 0.078 | — | 0.527 |

As seen in the comparative examples CE1, CE8, and CE9, the VR of polyolefins prepared by non-Z-N catalysts are relatively low in the range of ten to the fourteenth ohm.cm. As seen in the inventive examples IE1 to IE7, the compositions of the present disclosure (comprising a polyolefin, a fumed alumina, a silane compound, and a UV stabilizer) surprisingly and unexpectedly increase the VR by a significant amount. With VR in the range of ten to the sixteenth or seventeenth ohm.cm, the increase in VR in the inventive examples is at least one order of magnitude or higher.

In contrast, as seen in comparative examples CE2 to CE7, addition of only one or two of the fumed alumina, the silane compound, and the UV stabilizer to the polyolefin does not significantly improve the VR. Accordingly, without being bound by any theories, the results surprisingly demonstrate a synergistic effect of the components in the inventive compositions to improve the VR.

As seen in the comparative examples CE10 to CE12, cured polyolefin with peroxide had lower VR and higher DF (electrical loss). The inventive examples IE8 to IE10 show that the inventive compositions of the present disclosure surprisingly and unexpectedly improve the VR and the DF properties, with the improvement in DF being at least an order of magnitude.

In summary, the compositions of the present disclosure can significantly improve the electrical properties (higher VR and lower DF) of polyolefins, thereby enabling the use of such polyolefins in electrical related applications.

What is claimed is:

1. A curable composition, comprising, based on the total weight of the curable composition:
   from 95 wt % to 99.97 wt % of an ethylene/alpha-olefin/diene interpolymer comprising of from 55 to 70 wt % of polymerized ethylene and from 0.5 wt % to 8.5 wt % of polymerized diene, based on the based on the weight of the interpolymer, and having a Mooney viscosity (ML 1+4 at 125° C.) from 18 MU to 40 MU, in accordance with ASTM D1646 and a molecular weight distribution (MWD or Mw/Mn) from 2 to 4;
   from 0.5 wt % to 1.0 wt % of a fumed alumina;
   from 0.1 wt % to 2.0 wt % of a silane compound selected from the group consisting of: vinyl-trimethoxysilane, 3-(trimethoxysilyl) propylmethacrylate, and allyltrimethoxysilane;
   from 0.01 wt % to 1.0 wt % of a hindered amine UV stabilizer; and
   from 1.0 wt % to 3.0 wt % of a crosslinking agent;
   wherein the ethylene/alpha-olefin/diene interpolymer comprises a Group 4 metal in an amount of 0.3 ppm or greater.

2. The curable composition of claim 1, wherein the ethylene/alpha-olefin/diene interpolymer comprises vanadium in an amount of 0.4 ppm or less.

3. The curable composition of claim 1, wherein the curable composition has a volume resistivity of greater than 5.0E+15 ohm.cm.

4. A crosslinked polymer composition comprising the reaction product of the curable composition of claim 1.

5. The crosslinked polymer composition of claim 4, wherein the crosslinked polymer composition has a volume resistivity of greater than 5.0E+15 ohm.cm.

6. The crosslinked polymer composition of claim 4, wherein the crosslinked polymer composition has a dissipation factor of less than 2%.

7. An article comprising the crosslinked polymer composition of claim 4.

8. The article of claim 7, wherein the article has a volume resistivity of greater than 5.0E+15 ohm.cm.

9. The article of claim 7, wherein the article has a dissipation factor of less than 2%.

* * * * *